(12) United States Patent
Urabe et al.

(10) Patent No.: US 11,874,881 B2
(45) Date of Patent: Jan. 16, 2024

(54) BUSINESS DOCUMENTS PRESENTATION DEVICE, BUSINESS DOCUMENTS PRESENTATION METHOD AND BUSINESS DOCUMENTS PRESENTATION PROGRAM

(71) Applicant: Nippon Telegraph and Telephone Corporation, Tokyo (JP)

(72) Inventors: Yuki Urabe, Musashino (JP); Shiro Ogasawara, Musashino (JP); Tomonori Mori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 113 days.

(21) Appl. No.: 17/610,889

(22) PCT Filed: May 15, 2019

(86) PCT No.: PCT/JP2019/019401
§ 371 (c)(1),
(2) Date: Nov. 12, 2021

(87) PCT Pub. No.: WO2020/230309
PCT Pub. Date: Nov. 19, 2020

(65) Prior Publication Data
US 2022/0207091 A1 Jun. 30, 2022

(51) Int. Cl.
*G06F 16/93* (2019.01)

(52) U.S. Cl.
CPC .................... *G06F 16/93* (2019.01)

(58) Field of Classification Search
CPC .... G06Q 10/10; G06Q 10/06; G06F 16/9535; G06F 3/0482; G06F 16/951; G06F 16/248; G06F 9/453; G06F 3/0481; G06F 3/04842; G06F 9/451; G06F 16/93; G06F 16/68; G06F 16/338; G06N 20/00; G06N 3/08; G06N 5/047

See application file for complete search history.

(56) References Cited

U.S. PATENT DOCUMENTS

| 2003/0140309 A1 | 7/2003 | Saito et al. |
| 2009/0119290 A1 | 5/2009 | Lee |
| 2017/0132638 A1* | 5/2017 | Chigusa ................. G06F 16/93 |

(Continued)

FOREIGN PATENT DOCUMENTS

| JP | 05061912 | 3/1993 |
| JP | 2009541893 | 11/2009 |
| JP | 2010039671 | 2/2010 |

OTHER PUBLICATIONS

Blei, "Latent Dirichlet Allocation," Journal of Machine Learning Research, 2003, 3:993-1022.

(Continued)

*Primary Examiner* — Hau H Hoang
(74) *Attorney, Agent, or Firm* — Fish & Richardson P.C.

(57) ABSTRACT

A business-document presenting device includes processing circuitry configured to store text information displayed on a terminal screen during processing of a task in a past, acquire text information displayed on the terminal screen, and compare the acquired text information and the text information stored in the storage and extract different items of text information among tasks as keywords for searching for business documents.

15 Claims, 9 Drawing Sheets

(56) References Cited

U.S. PATENT DOCUMENTS

2018/0150555 A1* 5/2018 Karuppasamy ........ G06Q 10/20

OTHER PUBLICATIONS fess.codelibs.org, "Open-source full-text search server Fess," available on or before Mar. 18, 2013, retrieved on Apr. 3, 2019, retrieved from URL <https://fess.codelibs.org/ja/>, 2 pages (with English translation).

github.com, "Open XML SDK," GitHub, available on or before Sep. 4, 2014, retrieved on Apr. 3, 2019, retrieved from URL <https://github.com/OfficeDev/Open-XML-SDK>, 4 pages.

Jones, "A statistical interpretation of term specificity and its application in retrieval," Journal of Documentation, 1972, 28(1):11-21, 9 pages.

microsoft.com, "Microsoft Active Accessibility," Microsoft Docs, dated May 31, 2018, retrieved on Apr. 3, 2019, retrieved from URL <https://docs.microsoft.com/en-us/windows/desktop/winauto/microsoft-active-accessibility>, 2 pages.

microsoft.com, "UI Automation," Microsoft Docs, dated May 31, 2018, retrieved on Apr. 3, 2019, retrieved from URL <https://docs.microsoft.com/en-us/windows/desktop/winauto/entry-uiauto-win32>, 3 pages.

sei-info.co, "Features of QuickSolution," Sumitomo Electric Information Systems Co., Ltd., available on or before Feb. 25, 2012, retrieved on Apr. 3, 2019, retrieved from URL <https://www.sei-info.co.jp/quicksolution/>, 7 pages (with English translation).

taku910.github.io, "MeCab: Yet Another Part-of-Speech and Morphological Analyzer," available on or before Apr. 6, 2015, retrieved on Apr. 3, 2019, retrieved from URL <http://taku910.github.io/mecab/>, 20 pages (with English translation).

Urabe et al., "Document Recommendation Method based on Machine Translation the Content of Enterprise Documents for OSS Screen," IEICE Technical Report, Mar. 8, 2018, 117(491):25-30, 16 pages (with English translation).

w3.org, "Document Object Model (DOM)," W3C, available on or before Dec. 10, 1997, retrieved on Apr. 3, 2019, retrieved from URL <https://www.w3.org/DOM/>, 3 pages.

* cited by examiner

| ID | OPERATED WINDOW | TEXT |
|---|---|---|
| 1 | BUSINESS SYSTEM A | {NAME, AA CORPORATION, ADDRESS, CUSTOMER, TELEPHONE, NUMBER, SERVICE A, OPTION B ...} |
| 2 | BUSINESS SYSTEM A | {NAME, BB CORPORATION, ADDRESS, CUSTOMER, TELEPHONE, NUMBER, SERVICE A, TOKYO ...} |
| 3 | BUSINESS SYSTEM A | {NAME, CDE CORPORATION, ADDRESS, CUSTOMER, TELEPHONE, NUMBER, KANAGAWA, YOKOSUKA, SERVICE D ...} |
| ... | ... | ... |
| N | BUSINESS SYSTEM A | {DESIGNATION, YAMADA, HANAKO, ADDRESS, CUSTOMER, OSAKA ...} |

BUSINESS DOCUMENTS PRESENTATION DEVICE, BUSINESS DOCUMENTS PRESENTATION METHOD AND BUSINESS DOCUMENTS PRESENTATION PROGRAM

CROSS-REFERENCE TO RELATED APPLICATIONS

This application is a National Stage application under 35 U.S.C. § 371 of International Application No. PCT/JP2019/019401, having an International Filing Date of May 15, 2019. The disclosure of the prior application is considered part of the disclosure of this application, and is incorporated in its entirety into this application.

TECHNICAL FIELD

The present invention relates to a business-document presenting device, a business-document presenting method, and a business-document presenting program.

BACKGROUND ART

Generally, in a company operation such as operators' input and manipulation to active windows on computer screen, operation knowledge is shared as business documents to achieve smooth operations because operators have to deal with various factors including customer requests, facilities, and service.

Business documents are stored in various locations including a shared server and an internal site of a company, and many items of information on various topics are prepared as business documents as well as information on a target task. This leads to difficulty in finding a business document written concerning a task being handled by an operator.

Hence, in order to facilitate a search for business documents for operators, a technique of searching for relevant business documents based on inputted keywords is disclosed (see NPL 1). Furthermore, a technique is proposed to extract relevant business documents and present the documents to an operator by comparing all the words in text information displayed on an operated screen and words in business documents without the need for a keyword setting or keyword search by the operator (see NPL 2).

NPL 3 discloses IDF (Inverse Document Frequency) that indicates the characteristics of words in documents. NPL 4 discloses DOM (Document Object Model) for modeling a web page as an object. NPL 5 discloses MSAA (Microsoft Active Accessibility) for controlling Web accessibility. NPL 6 discloses Office XML SDK. NPL 7 discloses UTA (UI Automation) for automation of a screen operation. NPL 8 discloses MeCab for dividing Japanese text information into words. NPL 9 discloses open-source full-text search server Fess. NPL 10 discloses a topic model of document sorting.

CITATION LIST

Non Patent Literature

[NPL 1] "QuickSolution", [online], Sumitomo Electric Information Systems Co., Ltd., [search on Apr. 3, 2019], Internet URL:https://www.sei-info.co.jp/quicksolution/
[NPL 2] "Document Recommendation Method based on the Content of Enterprise Documents for OSS Screen", URABE Yuki, OGASAWARA Shiro, HOTTA Kentaro, INOUE Akira, IEICE technical report, Mar. 8, 2018, 117 (491), pp. 25-30
[NPL 3] K. Sparck Jones, "A Statistical Interpretation of Term Specificity and its Application in Retrieval", Journal of Documentation, 1972, Vol. 28, pp. 11-21
[NPL 4] "Document Object Model (DOM)", [online], 2005, W3C, [Search on Apr. 3, 2019], Internet <URL:https://www.w3.org/DOM/>
[NPL 5] "Microsoft Active Accessibility (MSAA)", [online], Microsoft Docs, [Search on Apr. 3, 2019], Internet <URL:https://docs.microsoft.com/en-us/windows/desktop/winauto/microsoft-active-accessibility>
[NPL 6] "Open XML SDK", [online], GitHub, [Search on Apr. 3, 2019], Internet <URL:https://github.com/OfficeDev/Open-XML-SDK>
[NPL 7] "UI Automation", [online], Microsoft Docs, [Search on Apr. 3, 2019], Internet <URL:https://docs.microsoft.com/en-us/windows/desktop/winauto/entry-ui-auto-win32>
[NPL 8] "MeCab: Yet Another Part-of-Speech and Morphological Analyzer", [online], 2013, [Search on Apr. 3, 2019], Internet <URL:http://taku910.github.io/mecab/>
[NPL 9] "Open-source full-text search server Fess", [online], [Search on Apr. 3, 2019], Internet <URL:https://fess.codelibs.org/ja/>
[NPL 10] D. M. Blei, A. Y. Ng, M. I. Jordan, "Latent Dirichlet Allocation", The Journal of Machine Learning Research, 2003, Vol. 3, pp. 993-1022

SUMMARY OF THE INVENTION

Technical Problem

However, in the related art, business documents including frequently appearing words from among words displayed in an operation screen are extracted as relevant documents. In this case, for a target task, business documents including consistent information such as "customer name" and "address" on a screen and universal information irrespective of variations of handled tasks are mainly extracted. Such business documents include an operation manual and a business-system operation manual. Thus, it is difficult to present business documents according to variations of handled tasks such that an operator, that is, a user of a business system can easily refer to the documents so as to clear obscure points in a task handled by the operator skilled in a universal operation method.

The present invention has been devised in view of the problem. An object of the present invention is to present business documents to a user according to variations of handled tasks.

Means for Solving the Problem

In order to solve the problem and attain the object, a business-document presenting device according to the present invention includes: processing circuitry configured to: store text information displayed on a terminal screen during processing of a task in a past; acquire text information displayed on the terminal screen; and compare the acquired text information and the text information stored in the storage and extract different items of text information among tasks as keywords for searching for business documents.

Effect of the Invention

The present invention can present business documents to a user according to variations of handled tasks.

DESCRIPTION OF EMBODIMENT

An embodiment of the present invention will be described in detail with reference to the accompanying drawings. The present invention is not limited by the embodiment. In the drawings, the same parts are indicated by the same reference numerals.

Figure 1:
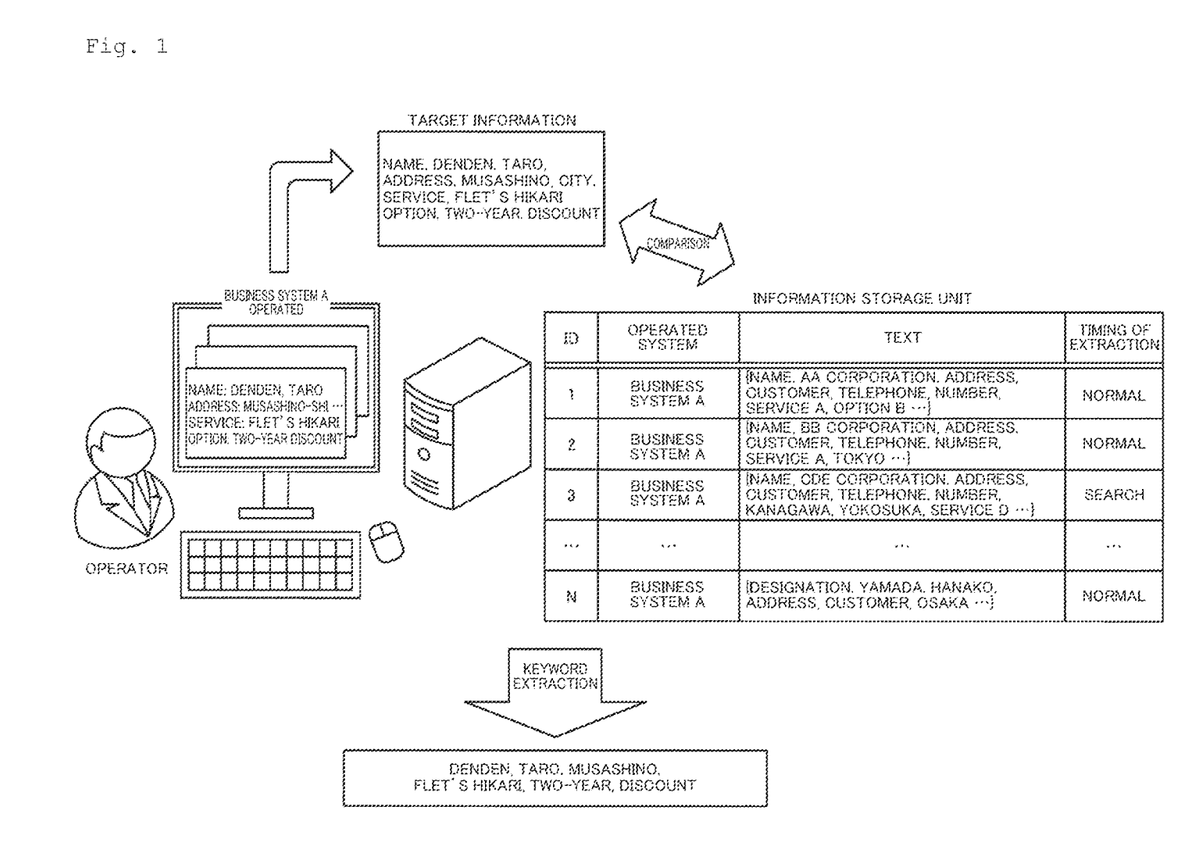
FIG. 1 is an explanatory drawing illustrating the outline of processing of a business-document presenting device according to the present embodiment.

[Outline of processing of a business-document presenting device] FIG. 1 is an explanatory drawing illustrating the outline of processing of a business-document presenting device according to the present embodiment. For example, if an operator indicates the occurrence of an obscure point during an operation of a business system, the business-document presenting device extracts, as target information, text information displayed on a terminal screen being operated and compares the information with the information of an information storage unit. In the information storage unit, text information displayed in the past on the terminal screen during the operations of the business system is accumulated. The business-document presenting device extracts, as keywords from target information, different items of text information according to tasks. Thereafter, the business-document presenting device searches business documents by using the extracted keywords, thereby presenting business documents to an operator according to variations of handled tasks during processing by the operator.

FIG. 1 illustrates that an operator indicates the occurrence of an obscure point during an input to, for example, a service application screen in a business system A. In this case, extracted target information includes consistent text information such as names, addresses, cities, and service of tasks and text information such as Denden, Taro, FLET'S Hikari, two-year, and discount that are different among tasks. Moreover, in the information storage unit, text information extracted from a displayed screen is accumulated. The text information is extracted periodically or at a proper time, for example, at a transition of screens in the past normal operations of the business system A.

The business-document presenting device specifies different items of text information among tasks by comparing target information and the text information of the information storage unit and extracts the specified items of information as keywords for searching for business documents. Thus, in the example of FIG. 1, the business-document presenting device extracts Denden, Taro, FLET'S Hikari, two-year, and discount, which are different among tasks, as keywords from the target information.

The business-document presenting device then searches for business documents including the extracted keywords by using, for example, a crawling technique and presents business documents including Denden, Taro, FLET'S Hikari, two-year, and discount to the operator. Thus, the operator can refer to the business documents according to variations of handled tasks.

Figure 2:
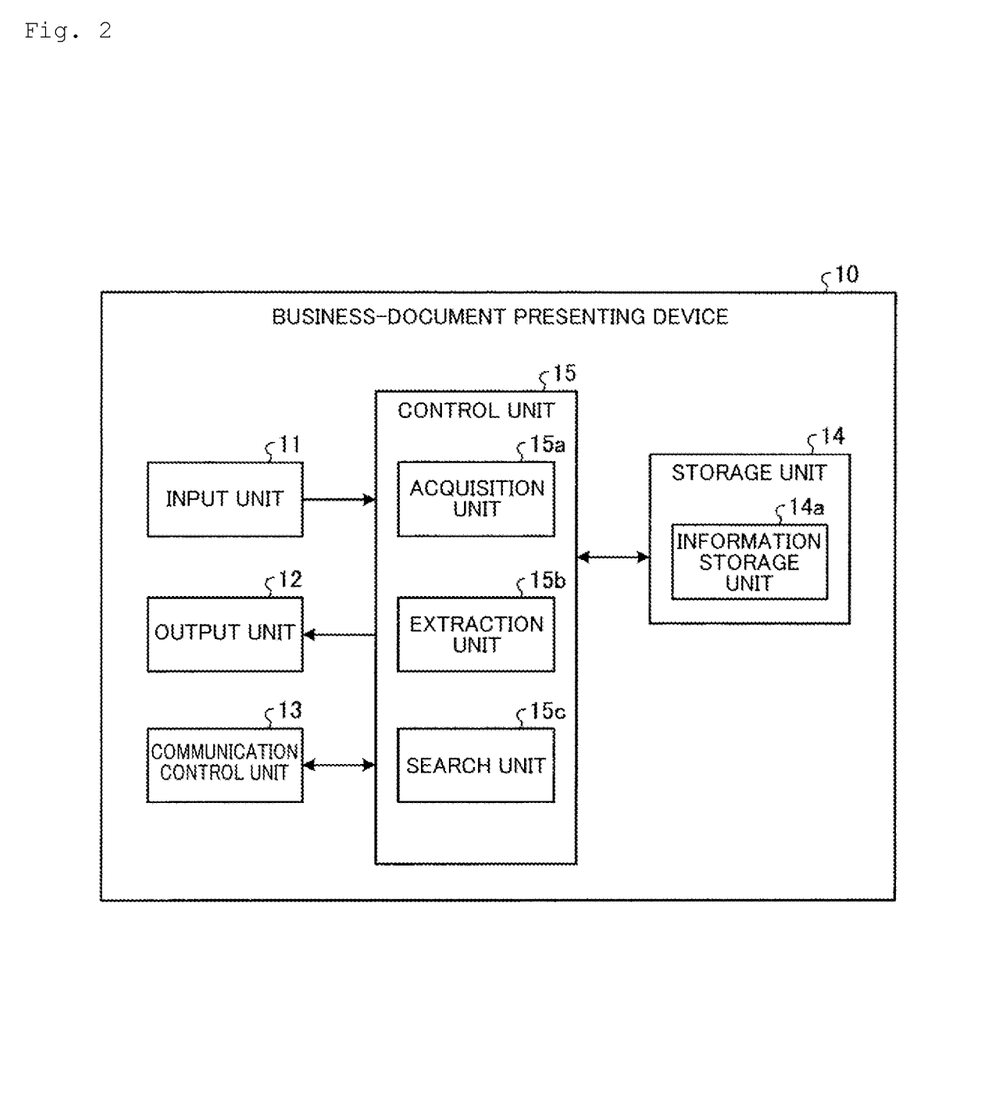
FIG. 2 is a schematic diagram illustrating a schematic configuration of the business-document presenting device according to the present embodiment.

[Configuration of the business-document presenting device] FIG. 2 is a schematic diagram illustrating a schematic configuration of the business-document presenting device according to the present embodiment. As illustrated in FIG. 2, a business-document presenting device 10 of the present embodiment is implemented by a general purpose computer, e.g., a personal computer and includes an input unit 11, an output unit 12, a communication control unit 13, a storage unit 14, and a control unit 15.

The input unit 11 is implemented by using an input device, e.g., a keyboard or a mouse and inputs a variety of instruction information including processing start into the control unit 15 in response to an input operation by an operator. The output unit 12 is implemented by a display device, e.g., a liquid crystal display or a printing device, e.g., a printer. For example, business documents to be presented to a user are displayed on the output unit 12 as a result of business document presentation, which will be described later.

The communication control unit 13 is implemented by, for example, an NIC (Network Interface Card) and controls communications between an external device and the control unit 15 via a telecommunication line, for example, an LAN (Local Area Network) or the Internet. For example, the communication control unit 13 controls communications between the control unit 15 and a shared server or the like for managing business documents including inter-office emails and various reports.

The storage unit 14 is implemented by semiconductor memory devices such as RAM (Random Access Memory) and flash memory or storage devices such as a hard disk and an optical disc. In the storage unit 14, a processing program for operating the business-document presenting device 10 and data used in the execution of the processing program are stored in advance or are temporarily stored each time processing is performed. The storage unit 14 may be configured to communicate with the control unit 15 via the communication control unit 13.

Figure 3:
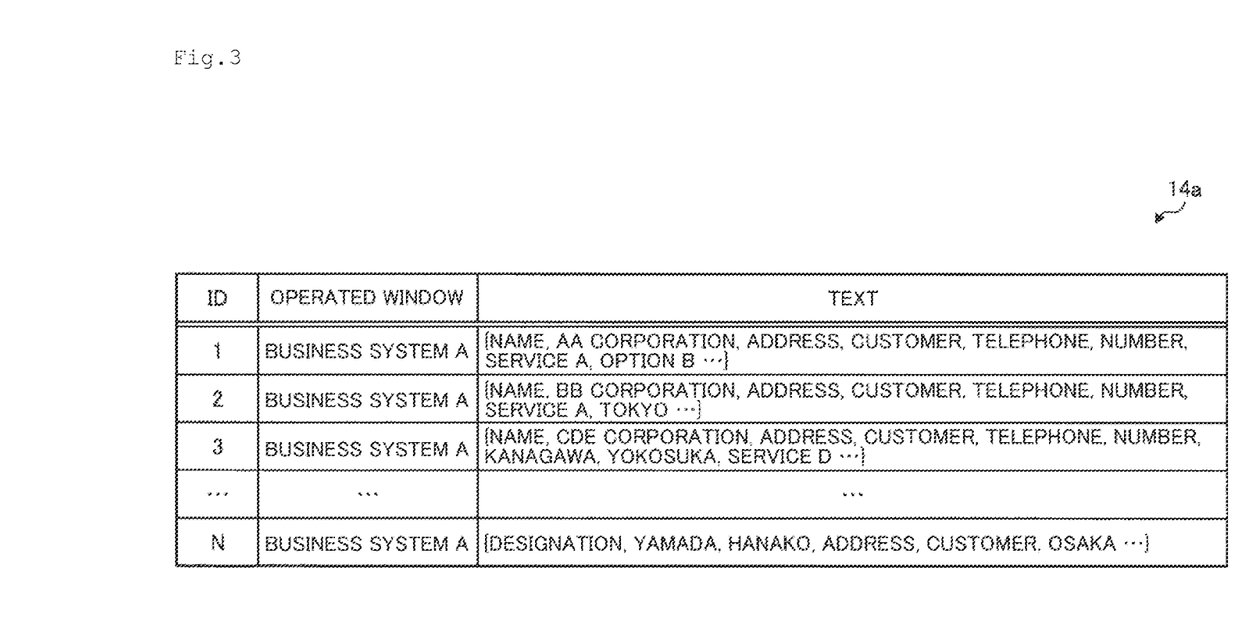
FIG. 3 illustrates the data configuration of an information storage unit.

In the present embodiment, the storage unit 14 stores text information displayed on a terminal screen during the processing of tasks in the past. Specifically, the storage unit 14 includes an information storage unit 14a. FIG. 3 illustrates the data configuration of the information storage unit 14a. As indicated in FIG. 3, the information of the information storage unit 14a includes IDs, an operated window, and text. An ID is information for identifying the information and is issued each time the information is stored in the information storage unit 14a. An operated window indicates a window being operated during the processing of a task in the past.

Text is text information displayed on the terminal screen. For example, text is divided into words and is stored in the information storage unit 14a.

The information is acquired by an acquisition unit 15a, which will be described later, periodically or at a proper time, for example, at a transition of screens or at the indication of search from a user prior to the business document presentation, which will be described later, and then the information is stored in the information storage unit 14a.

In FIG. 3, for example, the information of ID=1 is acquired at the above-mentioned time during the operation of a business system A. The text information includes, for example, a name, AA corporation, and an address.

FIG. 2 will be referred to again. The control unit 15 is implemented by using a CPU (Central Processing Unit) or the like and executes the processing program stored in the memory. Thus, as illustrated in FIG. 2, the control unit 15 acts as the acquisition unit 15a, an extraction unit 15b, and a search unit 15c. At least some of these functional units may be included in different pieces of hardware. For example, the search unit 15c may be included in a different piece of hardware from the acquisition unit 15a and the extraction unit 15b. Alternatively, the control unit 15 may include other functional units.

The acquisition unit 15a acquires text information displayed on the terminal screen during the processing of tasks in the past and stores the text information in the information storage unit 14a of the storage unit 14. The acquisition unit 15a acquires the text information displayed on the terminal screen periodically or at a proper time, for example, at a transition of screens or at the indication of search from a user during a past operation of the business system A.

Moreover, the acquisition unit 15a acquires text information displayed on the terminal screen. For example, when the occurrence of an obscure point during an operation of the business system is indicated by an operator via a GUI (Graphical User Interface), the acquisition unit 15a acquires text information displayed on the terminal screen being operated by the operator.

The acquisition unit 15a acquires text information displayed on an operation screen for all windows including active and inactive windows. For example, when detecting a change of an OS event or the GUI state of UIA (see NPL 7), the acquisition unit 15a acquires text information. In this case, by using the techniques of DOM (see NPL 4), MSAA (see NPL 5), Office XML SDK (see NPL 6), and UIA (see NPL 7), the acquisition unit 15a acquires text information displayed on the operation screen. Moreover, the acquisition unit 15a divides the acquired text information into words by using the technique of, for example, MeCab (see NPL 8).

Figure 4:
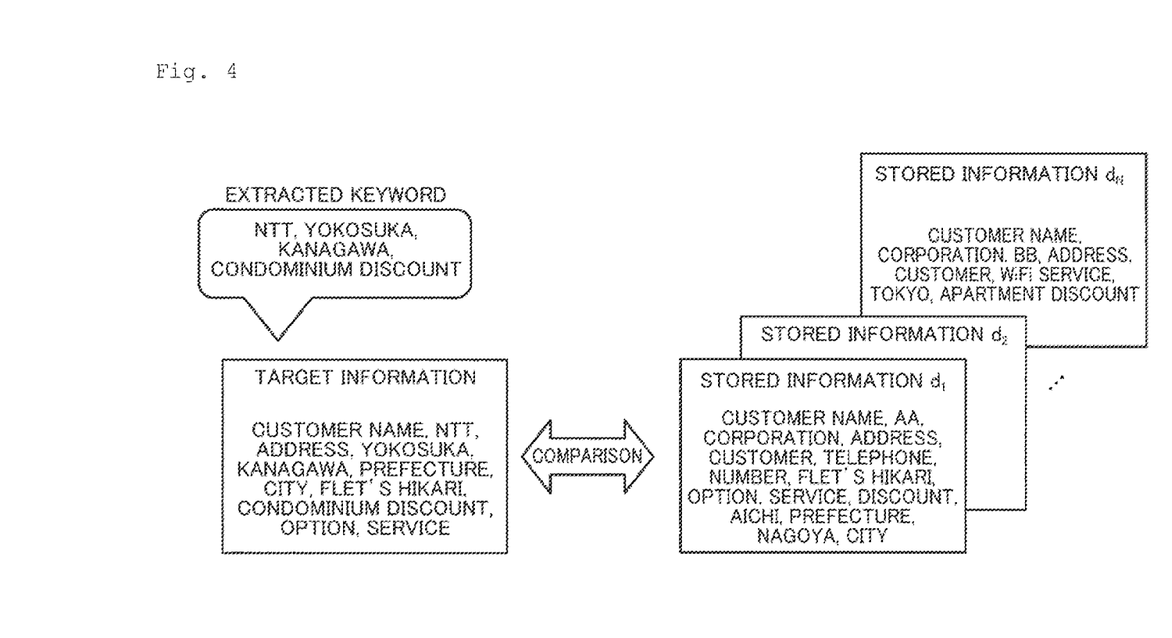
FIG. 4 is an explanatory drawing of the processing of an extraction unit.
Figure 5:
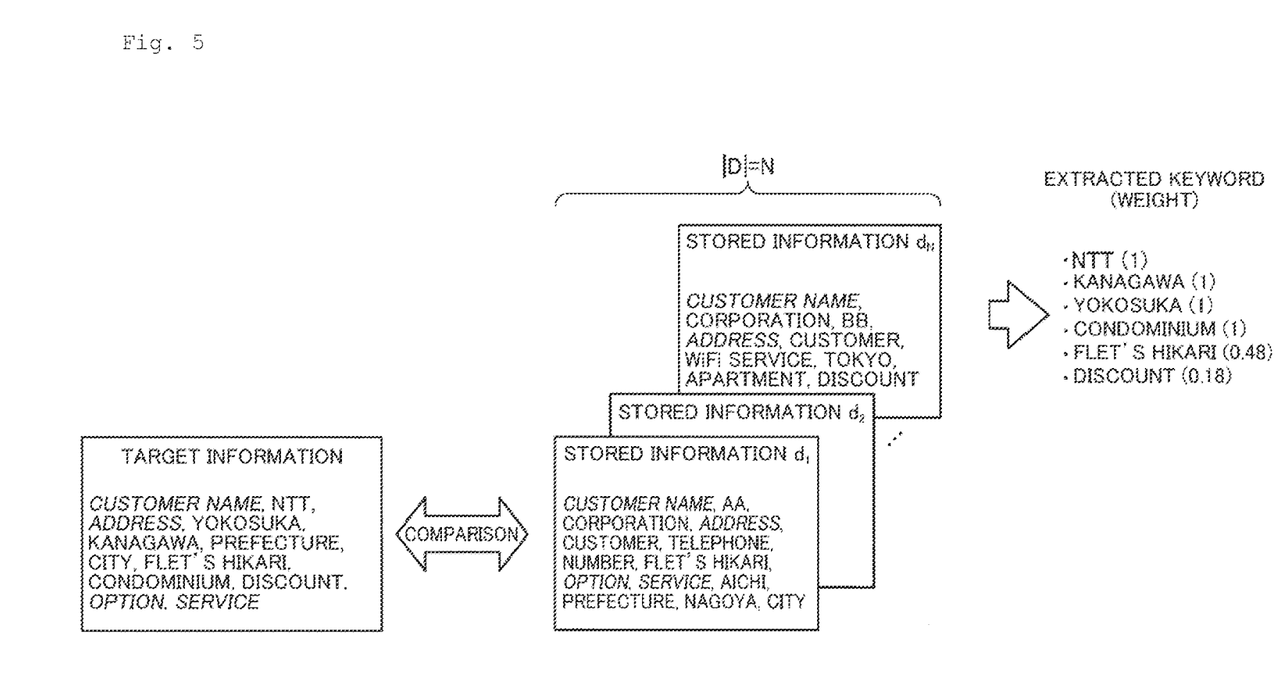
FIG. 5 is an explanatory drawing of the processing of the extraction unit.

The extraction unit 15b compares the acquired text information and text information stored in the storage unit 14 and extracts different items of text information among tasks as keywords for searching for business documents. The extraction unit 15b can compare the acquired text information only with text information acquired during an operation of the same window as an active window serving as the source of the text information or can be compared with all the pieces of information stored in the storage unit 14. FIGS. 4 and 5 are explanatory drawings of the processing of the extraction unit 15b.

For example, as keywords from the acquired text information, the extraction unit 15b extracts text information not included in the text information stored in the information storage unit 14a of the storage unit 14. In the example of FIG. 4, acquired target information and information $d_1, d_2, \ldots d_N$ stored in the information storage unit 14a are compared with each other, and NTT, Yokosuka, Kanagawa, and condominium discount, which have not been found in the past, are extracted.

In this way, the extraction unit 15b extracts text information not included in the information storage unit 14a, as different items of text information among tasks from the target information. This allows the extraction unit 15b to extract keywords indicating variations of handled tasks except for words expressing a target task, for example, words frequently appearing on a terminal screen or consistent words.

Alternatively, as keywords from the acquired text information, the extraction unit 15b extracts text information appearing with a lower frequency than a predetermined threshold value in the text information stored in the information storage unit 14a of the storage unit 14.

For example, the extraction unit 15b calculates the degree of a reduction in the occurrence frequency of words $t_i$ of the target information in the information storage unit 14a by using IDF values as expressed in Formula (1) below. The IDF value indicates the degree of a reduction in the occurrence frequency of a word. The IDF value increases as the occurrence frequency decreases. Thus, the extraction unit 15b extracts, as a keyword, a word with an IDF value larger than a predetermined value in the target information.

[Formula 1]

$$idf(t_i) \begin{cases} = \log\dfrac{|D|}{|\{d: d \ni t_i\}|} & (|\{d: d \ni t_i\}| > 0 \text{ is satisfied}) \\ = 1 & (|\{d: d \ni t_i\}| = 0 \text{ is satisfied}) \end{cases} \quad (1)$$

where $idf(t_i)$ is an idf value relative to the word $t_i$,
|D| is the total number of stored information items, and
|{d:d ∋ $t_i$}| is the number of information items including the word $t_i$ in the stored information.

In the example of FIG. 5, the acquired target information and the information $d_1, d_2, \ldots d_N$ stored in the information storage unit 14a are compared with each other, and NTT, Kanagawa, prefecture, Yokosuka, city, condominium, FLET'S Hikari, and discount are extracted. In this way, from the words of the target information, the extraction unit 15b extracts text information with a lower occurrence frequency than the predetermined threshold value in the information storage unit 14a as different items of text information among tasks. Thus, keywords indicating variations of handled tasks can be extracted except for words expressing a target task, for example, words frequently appearing on the terminal screen or consistent words.

Alternatively, as keywords from the acquired text information, the extraction unit 15b may extract text information having a weight that increases with a reduction in occurrence frequency in the text information stored in the information storage unit 14a of the storage unit 14. For example, the extraction unit 15b may assign weights to keywords according to the IDF values of the words $t_i$ of the target information, the IDF values being calculated according to Formula (1). In the example of FIG. 5, for example, the weight of "NTT" is 1, and the weight of "FLET'S Hikari" is 0.48. Hence, keywords indicating variations of handled tasks can be more properly extracted.

Furthermore, the extraction unit 15b sets a degree of 0 for the low frequency of consistent text information of tasks, for example, "customer name" and "address" that always appear on the same window of the information storage unit 14a as indicated by italic letters in FIG. 5. Thus, the extraction unit 15b can exclude consistent text information of tasks as stop words from extracted keywords.

FIG. 2 will be referred to again. The search unit 15c searches for business documents including the extracted keywords and presents the keywords to a user. The search unit 15c searches for business documents including the extracted keywords by using, for example, an existing crawling technique via the communication control unit 13. Moreover, by using keywords weighted by IDF values, the search unit 15c searches for business documents according to a technique of, for example, Fess (see NPL 9) while assigning priorities to the keywords in descending order of weight according to weights provided for the keywords by the extraction unit 15b.

Furthermore, the search unit 15c presents the business documents as a search result to the output unit 12 or another device via the communication control unit 13, and an operator as a user. Thus, the search unit 15c can present business documents to the user according to variations of handled tasks.

Alternatively, the search unit 15c may classify business documents according to the probability of occurrence of text information in the business documents. In this case, the search unit 15c may specify the classification of business documents by using common text information of tasks from acquired text information except for extracted keywords and search for business documents including the extracted keywords from business documents in the specified classification.

The search unit 15c classifies business documents according to topics based on the probability of occurrence of words in business documents by using, for example, document classification techniques such as a topic model (see NPL 10) and extracts words relevant to the topics. Moreover, the search unit 15c extracts words indicating a target task. The words are extracted by excluding, from the words of target information, words that are extracted as keywords and indicate variations of handled tasks. The search unit 15c then compares words relevant to the topics and the words indicating the target task in the target information and specifies the topic having many word matches as the topic of the target information.

Moreover, the search unit 15c searches for business documents including the extracted keywords from business documents in the specified topic. Thus, the business-document presenting device 10 can present more proper business documents to a user while limiting the business documents to a target task.

Figure 6:
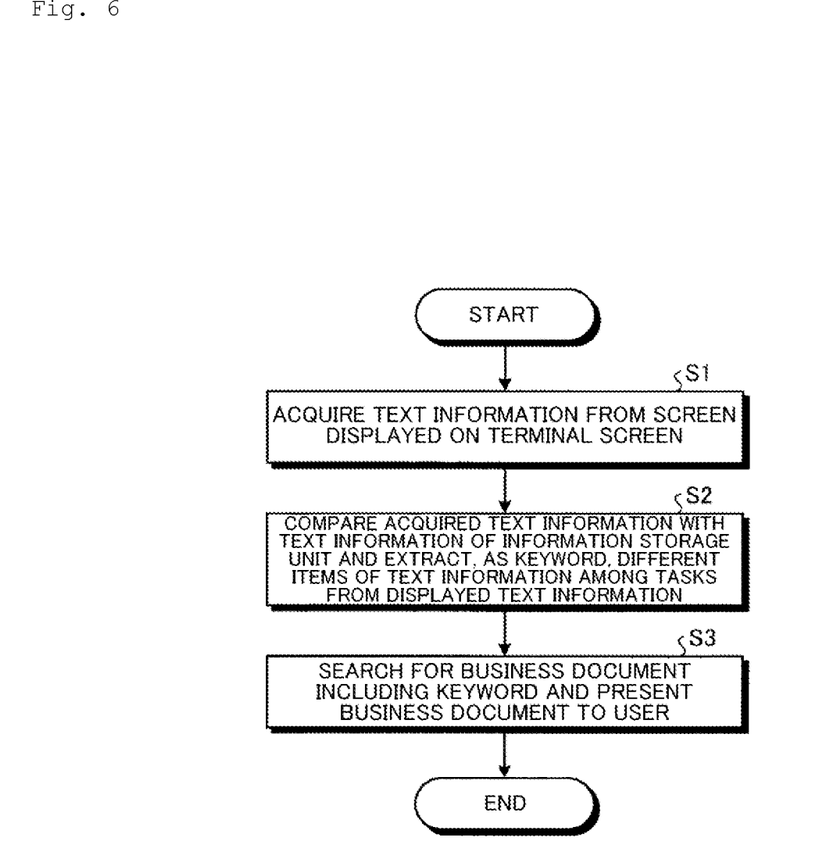
FIG. 6 is a flowchart indicating the steps of business document presentation.

[Business document presentation] Referring to FIG. 6, business document presentation by the business-document presenting device 10 according to the present embodiment will be described below. FIG. 6 is a flowchart indicating the steps of business document presentation. The flowchart of FIG. 6 is started in response to, for example, an input for indicating the occurrence of an obscure point by an operator.

First, the acquisition unit 15a acquires text information displayed on a terminal screen being operated by an operator (step S1).

The extraction unit 15b then compares the acquired text information and text information stored in the storage unit 14 and extracts different items of text information among tasks as keywords for searching for business documents (step S2).

For example, as keywords from the acquired text information, the extraction unit 15b extracts text information not included in the text information stored in the information storage unit 14a of the storage unit 14.

Alternatively, as keywords from the acquired text information, the extraction unit 15b extracts text information appearing with a lower frequency than the predetermined threshold value in the text information stored in the information storage unit 14a of the storage unit 14. In this case, as keywords from the acquired text information, the extraction unit 15b may extract text information having a weight that increases with a reduction in occurrence frequency in the text information stored in the information storage unit 14a of the storage unit 14.

The search unit 15e then searches for business documents including the extracted keywords and presents the business documents as a search result to an operator as a user (step S3).

The search unit 15c may classify the business documents into topics according to the probability of occurrence of text information in the business documents. In this case, the search unit 15c may specify the topic by using common text information of tasks from acquired text information except for extracted keywords and search for business documents including the extracted keywords from business documents in the specified topic. This completes the series of business document presentation.

As described above, in the business-document presenting device 10 of the present embodiment, the storage unit 14 stores text information displayed on the terminal screen during the processing of tasks in the past. Moreover, the acquisition unit 15a acquires text information displayed on the terminal screen. The extraction unit 15b compares the acquired text information and text information stored in the storage unit 14 and extracts different items of text information among tasks as keywords for searching for business documents.

Thus, the business-document presenting device 10 can extract keywords indicating variations of tasks handled by a user, thereby searching for business documents including the extracted keywords and presenting the business documents to the user according to variations of the handled tasks.

Figure 7:
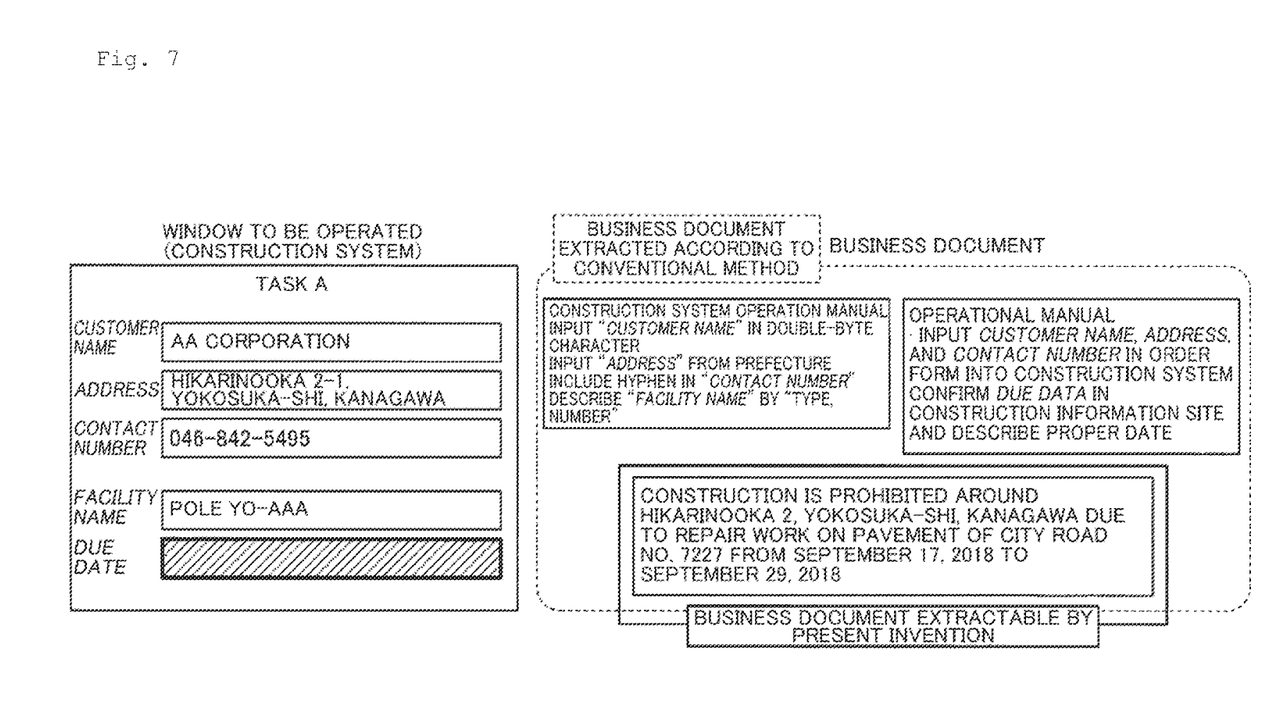
FIG. 7 is an explanatory drawing showing the effect of business document presentation.
Figure 8:
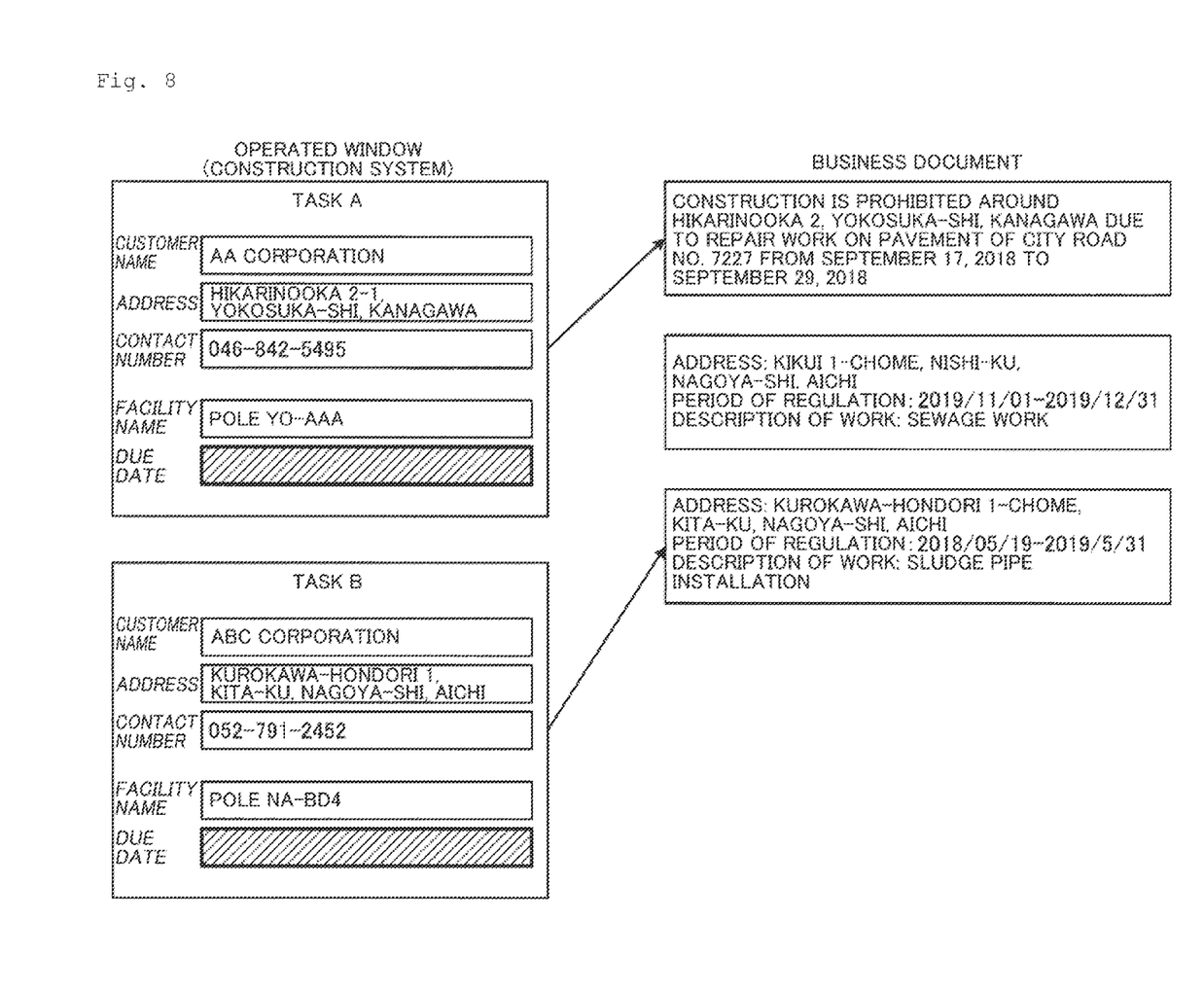
FIG. 8 is an explanatory drawing showing the effect of business document presentation.

FIGS. 7 and 8 are explanatory drawings showing the effect of business document presentation. In the example of FIG. 7, an operator is referring to business documents such as inter-office emails and various reports in order to input a delivery date into a shaded area on an input screen for task A during an operation of a construction system for infrastructure development.

In the case of conventional information, business documents including frequently appearing words are extracted as relevant business documents, so that business documents surrounded by a broken line are presented to the operator, the business documents including universal information such as "customer name", "address", and "contact number" that are italicized in FIG. 7. Since most of the business documents presented to the operator include universal information irrespective of variations of tasks, the operator has difficulty in reaching business documents matching a handled task.

In contrast, according to the present invention, business documents including a number of items of information such as "AA corporation" and "Hikarinooka 2, Yokosuka-shi, Kanagawa", which are different among tasks, are presented to an operator.

As indicated in FIG. 8, in particular, when the due date of a construction for infrastructure development is being inputted with reference to business documents in each region, business documents indicating the scheduled dates of road and waterworks constructions in each region are presented.

For example, when an operator is referring to business documents in order to input a due date indicated in a shaded area on the input screen for task A, business documents including "Hikarinooka 2, Yokosuka-shi, Kanagawa" that is information specific to task A are presented to the operator. When an operator is referring to business documents in order to input a due date indicated in a shaded area on an input screen for task B, business documents including "Kurokawa-hondori 1, Kita-ku, Nagoya-shi, Aichi" that is information specific to task B are presented to the operator.

Thus, the operator can input a due date of a construction for infrastructure development with reference to business documents indicating the scheduled dates of road and waterworks constructions in each region. In this way, even if different business documents are to be referred to for respective regions, the business document presentation presents proper business documents to the operator.

As described above, the business-document presenting device 10 preferentially extracts business documents dependent on tasks by using different items of text information among tasks as important keywords. Thus, the business-document presenting device 10 can present proper business documents to a user according to variations of tasks handled by the user without the need for a keyword setting or keyword search by the user. This achieves a smooth operation.

[Program]

A program can be created in a language such that a computer can perform the processing of the business-document presenting device 10 according to the embodiment. As one embodiment, the business-document presenting device 10 can be implemented by installing, on a desired computer, a business-document presenting program for performing the business document presentation as package software or online software. For example, the business-document presenting program is executed by an information processor, so that the information processor can act as the business-document presenting device 10. Such information processors include a desktop or laptop personal computer. Additionally, such information processors include mobile communication terminals such as a smartphone, a mobile phone, and a PHS (Personal Handyphone System) and slate terminals such as a PDA (Personal Digital Assistant). The functions of the business-document presenting device 10 may be implemented in a cloud server.

Figure 9:
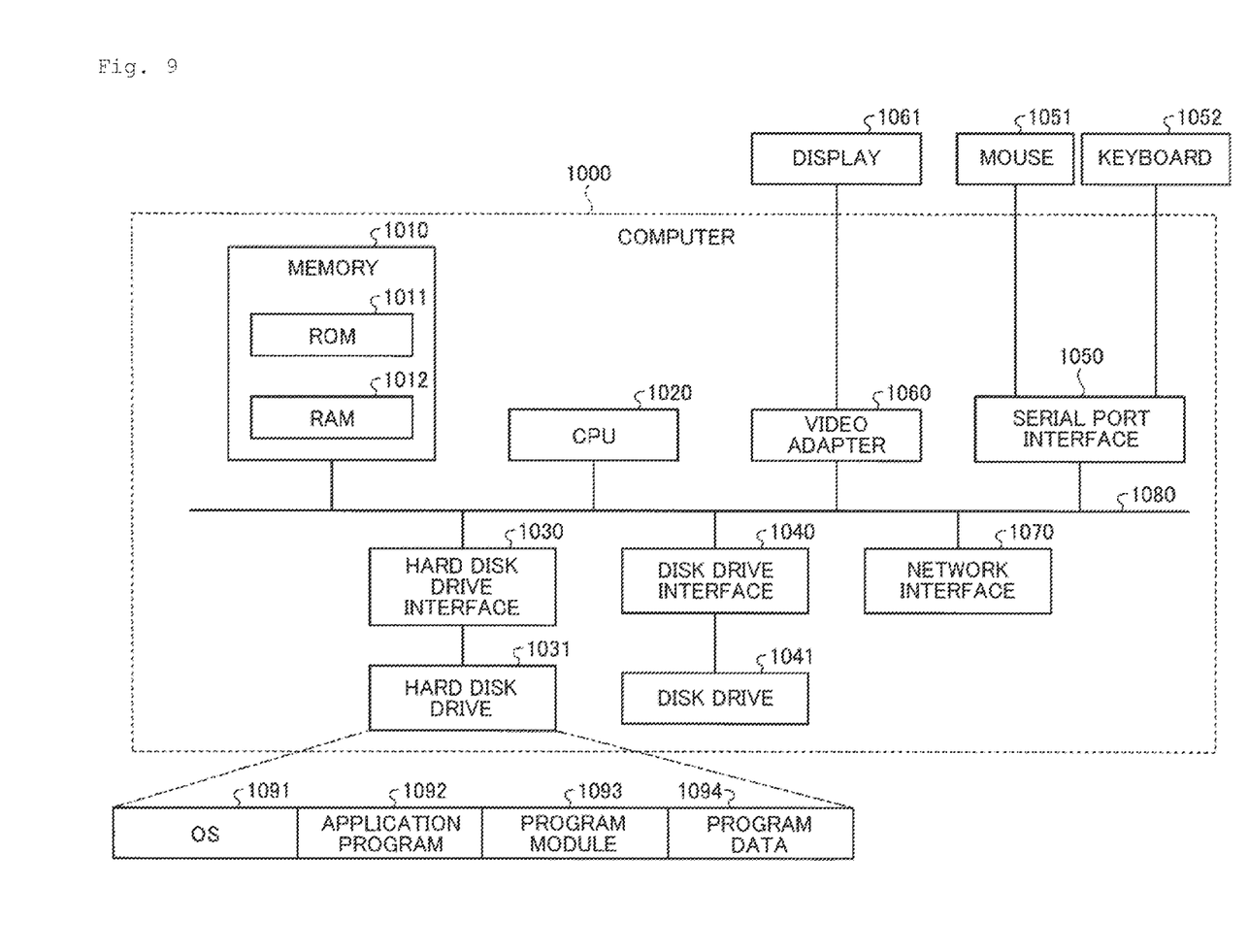
FIG. 9 illustrates an example of a computer for executing a business-document presenting program.

FIG. 9 illustrates an example of a computer for executing the business-document presenting program. A computer 1000 includes, for example, a memory 1010, a CPU 1020, a hard disk drive interface 1030, a disk drive interface 1040, a serial port interface 1050, a video adapter 1060, and a network interface 1070. These units are connected to one another via a bus 1080.

The memory 1010 includes a ROM (Read Only Memory) 1011 and a RAM 1012. The ROM 1011 stores, for example, boot programs such as a BIOS (Basic Input Output). The hard disk drive interface 1030 is connected to a hard disk drive 1031. The disk drive interface 1040 is connected to a disk drive 1041. In the disk drive 1041, a detachable storage medium, e.g., a magnetic disk or an optical disc is inserted. To the serial port interface 1050, for example, a mouse 1051 and a keyboard 1052 are connected. To the video adapter 1060, for example, a display 1061 is connected.

In the hard disk drive 1031, for example, an OS 1091, an application program 1092, a program module 1093, and program data 1094 are stored. The information described in the embodiment is stored in, for example, the hard disk drive 1031 or the memory 1010.

Moreover, the business-document presenting program is stored in the hard disk drive 1031 as, for example, the program module 1093 describing commands executed by the computer 1000. Specifically, the program module 1093 describing processing performed by the business-document presenting device 10 as described in the embodiment is stored in the hard disk drive 1031.

Furthermore, data used for information processing by the business-document presenting program is stored as the program data 1094 in, for example, the hard disk drive 1031. The CPU 1020 then performs the foregoing steps by optionally reading the program module 1093 and the program data 1094, which are stored in the hard disk drive 1031, into the RAM 1012.

The program module 1093 and the program data 1094 for the business-document presenting program are not always stored in the hard disk drive 1031 and may be stored in, for example, a detachable storage medium and read by the CPU 1020 via the disk drive 1041 or the like. Alternatively, the program module 1093 and the program data 1094 for the business-document presenting program may be stored in another computer connected via networks such as a LAN and a WAN (Wide Area Network) and read by the CPU 1020 via the network interface 1070.

The invention made by the present inventors is applied to the foregoing embodiment. The present invention is not limited by a description of the present embodiment, that is, a part of the disclosure of the present invention and the drawings. In other words, other embodiments, examples, and operation techniques that are implemented by a person skilled in the art based on the present embodiment are all included in the scope of the present invention.

REFERENCE SIGNS LIST

10 Business-document presenting device
11 Input unit
12 Output unit
13 Communication control unit
14 Storage unit
14a Information storage unit
15 Control unit
15a Acquisition unit
15b Extraction unit
15c Search unit

The invention claimed is:

1. A business-document presenting device comprising:
processing circuitry configured to:
    store text information displayed on a terminal screen during processing of a task in a past;
    acquire text information displayed on the terminal screen;
    compare the acquired text information and the text information stored in the storage; and
    extract different items of text information among different tasks as a list of keywords for searching for business documents while excluding consistent text information of tasks.

2. The business-document presenting device according to claim 1, wherein from the acquired text information, the processing circuitry is further configured to extract, as the keywords, text information excluded from the text information stored in the storage.

3. The business-document presenting device according to claim 1, wherein from the acquired text information, the processing circuitry is further configured to extract, as the keywords, text information appearing with a lower frequency than a predetermined threshold value in the text information stored in the storage.

4. The business-document presenting device according to claim 3, wherein from the acquired text information, the processing circuitry is further configured to extract, as the keywords, text information having a weight that increases with a reduction in occurrence frequency in the text information stored in the storage.

5. The business-document presenting device according to claim 1, wherein the processing circuitry is further configured to classify business documents according to probability of occurrence of text information in the business documents, specify classification of the business documents by using common text information of tasks except for the extracted keywords in the acquired text information, and search for business documents including the extracted keywords from business documents in the specified classification.

6. A business-document presenting method performed by a business-document presenting device, the business-document presenting device including a storage configured to store text information displayed on a terminal screen during processing of a task in a past, the business-document presenting method comprising:
    acquiring text information displayed on the terminal screen;
    comparing the acquired text information and the text information stored in the storage; and
    extracting different items of text information among different tasks as a list of keywords for searching for business documents while excluding consistent text information of tasks.

7. A non-transitory computer-readable recording medium storing therein a business-document presenting program that causes a computer to execute a process comprising:
    acquiring text information displayed on a terminal screen;
    referring to a storage configured to store text information displayed on the terminal screen during processing of a task in a past;
    comparing the acquired text information and the text information stored in the storage; and
    extracting different items of text information among different tasks as a list of keywords for searching for business documents while excluding consistent text information of tasks.

8. The business-document presenting method according to claim 6, further comprising: from the acquired text information, extracting, as the keywords, text information excluded from the text information stored in the storage.

9. The business-document presenting method according to claim 6, further comprising: from the acquired text information extracting, as the keywords, text information appearing with a lower frequency than a predetermined threshold value in the text information stored in the storage.

10. The business-document presenting method according to claim 9, further comprising: from the acquired text information, extracting, as the keywords, text information having a weight that increases with a reduction in occurrence frequency in the text information stored in the storage.

11. The business-document presenting method according to claim 6, further comprising: classifying business documents according to probability of occurrence of text information in the business documents, specifying classification of the business documents by using common text information of tasks except for the extracted keywords in the acquired text information, and searching for business documents including the extracted keywords from business documents in the specified classification.

12. The non-transitory computer-readable recording medium according to claim 7, wherein the process further comprises: from the acquired text information, extracting, as the keywords, text information excluded from the text information stored in the storage.

13. The non-transitory computer-readable recording medium according to claim 7, wherein the process further comprises: from the acquired text information extracting, as the keywords, text information appearing with a lower frequency than a predetermined threshold value in the text information stored in the storage.

14. The non-transitory computer-readable recording medium according to claim 13, wherein the process further comprises: from the acquired text information, extracting, as the keywords, text information having a weight that increases with a reduction in occurrence frequency in the text information stored in the storage.

15. The non-transitory computer-readable recording medium according to claim 7, wherein the process further comprises: classifying business documents according to probability of occurrence of text information in the business documents, specifying classification of the business documents by using common text information of tasks except for the extracted keywords in the acquired text information, and searching for business documents including the extracted keywords from business documents in the specified classification.

* * * * *